Patented Dec. 31, 1946

2,413,667

UNITED STATES PATENT OFFICE 2,413,667

FIRE EXTINGUISHING COMPOSITION

George Gordon Urquhart, Wynnewood, Pa., assignor to National Foam System, Inc., Philadelphia, Pa., a corporation of Delaware No Drawing. Application April 8, 1943,
Serial No. 482,309

2 Claims. (Cl. 252—8.05)

This invention relates generally to fire extinguishing compositions and more particularly to such compositions as are capable, when combined with water, of producing a stabilized foam which is non-supporting to combustion and serves as a blanket to smother and extinguish the flames of such combustible materials as oil and gasolene.

Heretofore and prior to this invention, various foam-forming compositions have been employed more or less successfully to combat oil and gasolene fires. These compositions ordinarily involve the use of sodium bicarbonate and aluminum sulphate together with a stabilizing ingredient such as extract of licorice or of oak bark to increase the surface viscosity of the gas bubbles formed when the composition is combined with water. While it has been found preferable to introduce the acid and basic foam producing reagents together with the stabilizing ingredient into flowing water in the form of dry powders, in some systems separate solutions of these reagents are maintained in suitable tanks from which they are drawn off and mixed together to form foam as the necessity required. In one form of the dry powder system, the powdered sodium bicarbonate (the basic reagent), the powdered aluminum sulphate (the acid reagent) and the powdered stabilizer are commonly introduced into a single stream of water which conveys the foam to the fire to be extinguished. In another form of the dry powder system, the powdered basic and acid ingredients are simultaneously introduced into separate streams of water to respectively form separate acid and basic solutions which are subsequently merged into a single stream whereupon the foam is produced as a product of the reaction, the stabilizer being introduced into one or the other of the streams of water together with the acid or basic reagent. The methods just described produce foam as the result of the chemical reaction between the acid and basic foam forming solutions and the foam so produced is best termed chemical foam.

As distinguished from such chemical foam is the so-called mechanical or air foam, which while resembling in appearance and action the chemical foam, is formed not by the chemical reaction of foam forming solutions by but entraining a gaseous medium, such as air, into a finely subdivided stream of water in the presence of a suitable foaming agent or stabilizer, the production of such mechanical foam being described more particularly in the prior United States Letters Patent No. 2,106,043, January 18, 1938, and No. 2,198,585, April 23, 1940.

As I have heretofore pointed out in United States Letters Patent No. 2,269,958, granted January 13, 1942, the proteins derived from the soybean offer an excellent material for use as a foam stabilizer because such proteins impart to the foam bubbles rigid adsorption surfaces. While such foam stabilizer in the form of a water-dispersible proteinaceous product derived from the soybean has proved to be quite satisfactory under general conditions of use, I have found that the glycol ethers, as well as the glycols themselves, when suitably incorporated in and made part of such foam stabilizer enhances its properties in certain material respects, as by increasing the volume of foam produced from a given quantity of foaming agent derived from soybean protein and by rendering such foaming agent more readily dispersible in the water stream under varying conditions of temperature and of greater fluidity at lower temperatures. In addition, the incorporation of the glycols and/or their ethers in the foaming agent derived from soybean protein renders the foam produced thereby more stable and of such increased cohesive and adhesive characteristics that the mass of foam is less subject to rapid disintegration or deterioration when applied as a fire smothering blanket and is better able to cling to the surfaces to which it is applied.

Although the use of a glycol ether, such as the monoethyl ether of diethylene glycol, has heretofore been suggested by me in my prior patents No. 2,157,579, of May 9, 1939, and No. 2,194,680, of March 26, 1940, as a suitable agent to increase the effectiveness of a foaming solution for use in the recovery of volatile petroleum products, the addition of the glycol ethers or of the glycols themselves for increasing the effectiveness of a fire extinguishing foam producing agent in the form of a water-dispersible proteinaceous product derived from the soybean has never been suggested prior to my own discovery of its value for that specific purpose and it is accordingly among the objects of this invention to increase the effectiveness of the foaming agent derived from soybean protein by incorporating therein one or more of the glycols and their ethers.

The soybean protein, which constitutes the principal ingredient of the foaming agent of the present invention, is derived from the soybean generally by extraction of the oil and subsequent extraction of the protein. Inasmuch as this protein is now commercially available in a quality which is to a great extent free of carbohydrates and other constituents of the original bean, it being preferable to employ the protein free of carbohydrates, a detailed description of the production of the soybean protein is not deemed necessary herein.

In the production of the foaming agent of the present invention, a batch of the agent is produced in accordance with the following procedure. Into 1500 gallons of water, heated to about 200° F., is added approximately 300 pounds of hydrated lime of high calcium content. This mass is mechanically stirred in the heating tank until a thorough admixture is obtained, the temperature of the water being maintained during all of the mixing period at between 200° F. and 210° F. To this mixture is then added 1500 pounds of the soybean protein, this latter being gradually introduced into the tank over a 45 minute period by sifting in the protein, thereby avoiding excessive lump formations.

This mass (of water, lime and protein) is continued to be heated over a period of 12 hours at a sustained temperature of approximately 200° F., following which approximately 47 gallons of sulphuric acid (60° Baumé) is added. In order to prevent flowing over of the mass during the addition of the acid, the latter should be introduced slowly, and thereafter the acid reaction is permitted to continue for a period of about 4 hours.

It is preferable that the reaction mass have a pH of about 7.4 to render the foaming agent produced therefrom suitably soluble in water and to that end approximately 200 additional pounds of neutralizing lime are added to the reaction mass, which is then stirred for an additional hour or so. It will be understood that all of the foregoing operations are carried out while maintaining the temperature of the liquid mass between 200 and 210 degrees F.

The reaction mass is then filtered to remove the calcium sulphate (resulting from the reaction of the lime and acid) and other insoluble material that may be present, following which the dilute filtrate is evaporated to a specific gravity of about 1.145. Preferably, this evaporation is effected in two stages, first by evaporating the original filtrate to a specific gravity of about 1.110 and then re-filtering the filtrate and further evaporating it to the desired specific gravity of 1.145, in which final form the filtrate is discharged from the evaporator into a suitable tank for the addition of such inhibitors as may be necessary. These inhibitors are added for the purpose of preserving and inhibiting the final product from subsequent deterioration and to retard decomposition, a suitable inhibitor for this purpose being sodium pentachlorophenate.

The resultant product is now again filtered into a blending tank where the glycols or their ethers are introduced to the extent of approximately fifteen percent (15%) by volume of the completed product. While either one of the glycol ethers, such as the mono ethyl ether of ethylene glycol or the mono ethyl ether of diethylene glycol, or of the glycols themselves, may be used singly and to the exclusion of the others, I prefer to mix equal parts of the said glycol ethers for use as the addition agent. Also, while the preferred proportion of the addition agent is about 15 percent by volume of the total amount of the final product, this proportion may be varied within rather wide limits, the percentage of the addition agent employed influencing the volume and quality of the foam produced. Thus, by decreasing the proportion of the addition agent in the final product, the volume of foam produced with a given quantity of the foaming agent is reduced, while conversely if the proportion of addition agent is increased, the volume of foam is increased although at the expense of rendering the foam less dense.

In the use of the foam forming agent produced in accordance with the present invention, the proportions thereof will vary, of course, in accordance with the ingredients used therewith to produce stabilized foam. Thus, for the production of mechanical foam, it may be employed in the proportion of approximately three to nine percent by volume of the water with which it is admixed to produce fire extinguishing foam in accordance with the methods and apparatus disclosed in the aforesaid patents Nos. 2,106,043 and 2,198,585.

Where the foam forming agent of the present invention is desired to be used in the production of chemical foam, it may be incorporated in the basic charge in the proportion of 4 ounces of such agent to 22 ounces of sodium bicarbonate dissolved in 1¾ gallons of water, the corresponding acid charge consisting of 32 ounces of aluminum sulphate dissolved in 2¼ pints of water.

It will be understood, of course, that none of the proportions of ingredients hereinbefore described are critical and that such proportions may be varied within reasonable limits without departing from the general principles or real spirit of the invention as defined in the appended claims.

What is claimed as new and useful is:

1. A process of producing a stable fire-extinguishing foam which comprises mixing a gaseous medium in a finely subdivided stream of water containing 3 to 9% of a stabilizer consisting of a proteinaceous material derived from the soybean in combination with a substance selected from the group consisting of the glycols and their ethers.

2. A stabilizer for fire extinguishing foam consisting of a concentrated aqueous solution of a proteinaceous product derived from the soy bean and degraded by successive alkali and acid treatments at approximately 200° F., said solution being of a specific gravity of approximately 1.145, and a substance from the class consisting of glycols and their ethers, said substance being included in said solution in the proportion of about 15% by volume.

GEORGE GORDON URQUHART.